United States Patent [19]

Karlsen

[11] Patent Number: 5,391,040
[45] Date of Patent: Feb. 21, 1995

[54] APPARATUS FOR HANDLING BOXES

[76] Inventor: Torbjörn Karlsen, Teknikvagen 119, Järfälla, Sweden, 175 75

[21] Appl. No.: 793,370
[22] PCT Filed: Jul. 3, 1990
[86] PCT No.: PCT/SE90/00477
  § 371 Date: Jan. 3, 1992
  § 102(e) Date: Jan. 3, 1992
[87] PCT Pub. No.: WO91/00230
  PCT Pub. Date: Jan. 10, 1991

[30] Foreign Application Priority Data

Jul. 3, 1989 [SE] Sweden ............................. 8902411-1
May 14, 1990 [SE] Sweden ............................. 9001725-2

[51] Int. Cl.6 .................................................. B65G 21/02
[52] U.S. Cl. ............................................. 414/469; 410/51; 206/511
[58] Field of Search ............... 414/495, 498, 467, 469, 414/490, 600, 623, 679; 206/509, 511; 220/23, 83; 410/51, 120; 221/134; 280/43.17, 43.12, 47.28, 47.371, 79.11; 298/22 R

[56] References Cited

U.S. PATENT DOCUMENTS

| 738,710 | 9/1903 | Whitlock | 410/51 |
|---|---|---|---|
| 1,085,237 | 1/1914 | Bell | 410/51 |
| 2,281,012 | 4/1942 | Sears | 414/622 |
| 2,620,932 | 12/1952 | Alpine | 414/622 X |
| 3,290,051 | 12/1966 | O'Brien et al. | 410/51 X |
| 3,355,054 | 11/1967 | Wilson | 220/23.6 |
| 3,549,018 | 12/1970 | Wilson | 206/509 |
| 4,756,540 | 7/1988 | Crawford | 280/47.28 |
| 4,771,531 | 9/1988 | Asher | 280/47.371 X |

FOREIGN PATENT DOCUMENTS

| 85916/75 | 4/1977 | Australia . | |
|---|---|---|---|
| 49160/79 | 3/1980 | Australia . | |
| 50600/85 | 6/1985 | Australia . | |
| 63116/86 | 3/1987 | Australia . | |
| 197090 | 7/1965 | Sweden . | |
| 413480 | 7/1934 | United Kingdom | 206/511 |
| 1368258 | 1/1988 | U.S.S.R. . | |

Primary Examiner—Michael S. Huppert
Assistant Examiner—Stephen Gordon
Attorney, Agent, or Firm—Keck, Mahin & Cate

[57] ABSTRACT

Apparatus for tilting mutually stacked boxes is useful when the top edge of a lower box in the stack is in guiding engagement with the bottom edge of an overlying box. The tilting device holds the boxes together in the stack and includes an element which is pivotally attached on or adjacent to a base supporting the stack, and which can be swung out from a first position in which the element extends substantially parallel with one side of the stack to another position in which the element forms an angle with this side. The element has mounted on the top thereof an abutment for abutting with a spring device operative to urge the gripping and holding device against the top edge of the uppermost box of the stack.

6 Claims, 4 Drawing Sheets

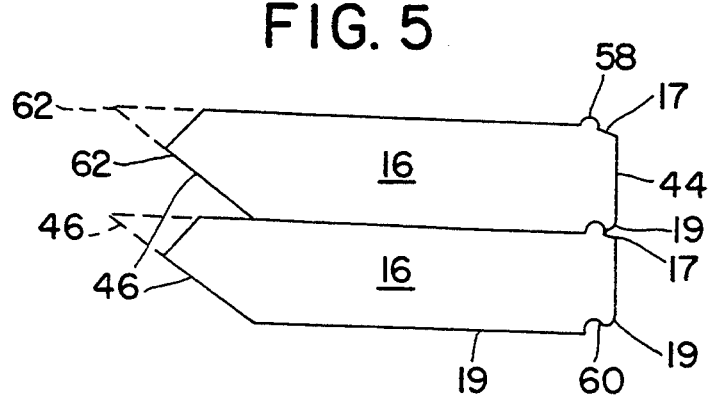
FIG. 5
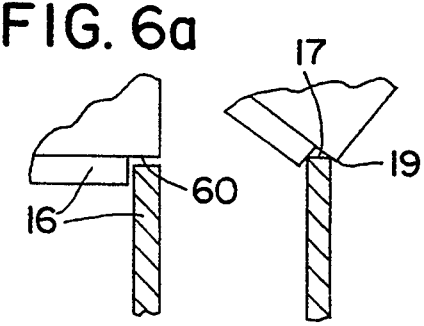
FIG. 6a / FIG. 6b
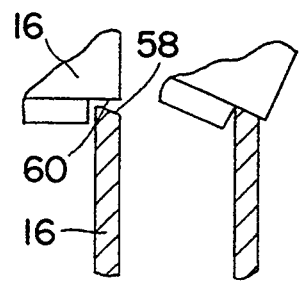
FIG. 7a / FIG. 7b
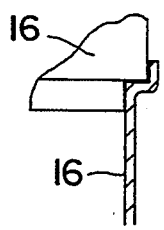
FIG. 8a
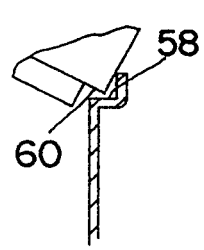
FIG. 8b
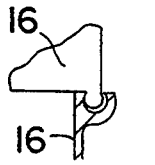
FIG. 9a
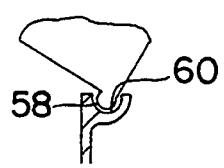
FIG. 9b

APPARATUS FOR HANDLING BOXES

FIELD OF THE INVENTION

The present invention relates to apparatus for handling boxes which are capable of being stacked one upon the other.

BACKGROUND OF THE INVENTION

Many of the items produced in piecegoods manufacturing processes are placed in boxes, which are then stacked one on top of the other and transported to intermediate storage localities or to later process stages. Other products which are placed in boxes and the boxes then stacked for further transport include agricultural and garden products.

It is found that filling and emptying of these boxes can result in serious wear-and-tear on the body and in personal injury. For instance, subsequent to filling one box, or crate, the worker is required to turn and face a stack of empty boxes, to remove an empty box from the stack, and to turn back to the filled box and place the empty box thereon. The spine or back of the worker is placed under considerable strain as a result of the twisting and bending movements constantly performed by the worker to this end. The task of moving the boxes also involves unnecessary working steps, which detracts from optimum production efficiency.

SUMMARY OF THE INVENTION

The object of the present invention is therefore to provide an apparatus for handling stackable boxes or crates, which will enable a selected box in a box stack to be made available for the introduction of goods into the box or the removal of goods therefrom without needing to lift the boxes manually one from the other.

A further object of the invention is to provide boxes or crates which are particularly suited for use with the inventive apparatus. Still another object of the invention is to provide a method for use with said apparatus, such as to enable a selected box in a stack of boxes to be made accessible for filling or for emptying of the box selected.

BRIEF DESCRIPTION OF THE DRAWINGS

The invention will now be described in more detail with reference to non-limiting, exemplifying embodiments thereof, and with reference to the accompanying drawings, in which:

FIGS. 5-9 illustrate various examples of boxes or crates which are particularly suited for use with the invention.

DETAILED DESCRIPTION OF THE PREFERRED EMBODIMENT

Figure 1:
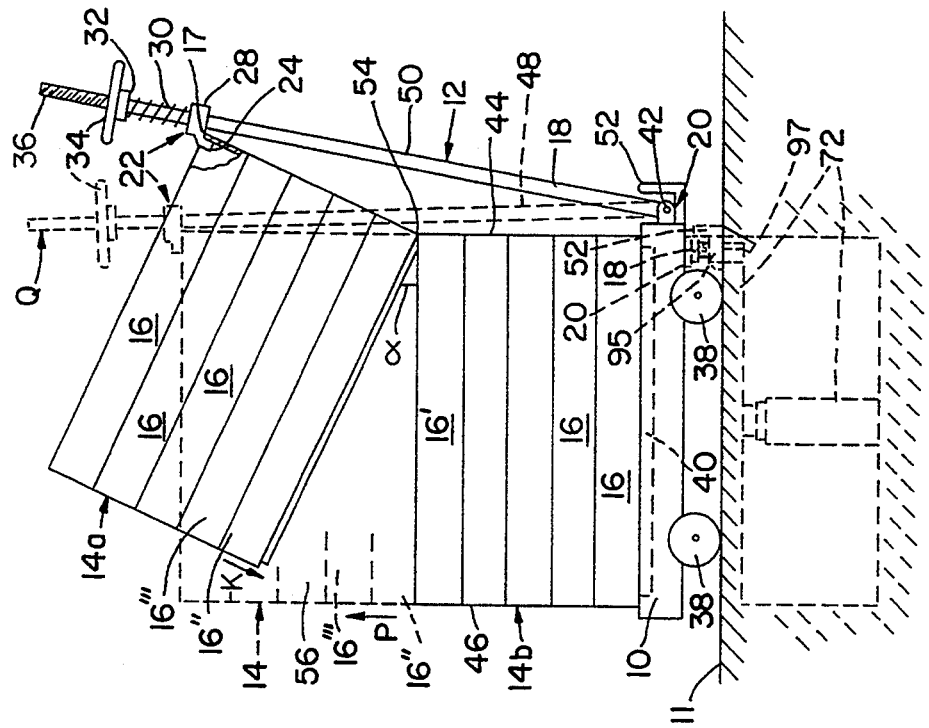
FIG. 1 is a side view of apparatus constructed in accordance with the invention.

FIG. 1 illustrates an inventive apparatus comprising a base 10 and a tilting or tipping device 12 which is pivotally connected to said base. A stack 14 of boxes or crates 16 is placed on the base 10. The tilting device 12 comprises an element 18, in this case a rod, which is affixed to a pivot journal 20 at the base 10. Mounted on the upper end of the rod 18 is a gripping and holding device 22 having a claw or hook 24 which engages the upper edge 17 of the uppermost box 16. The other end of the gripping and holding device 22 is configured to form a bushing 28, which is slideable axially along the rod 18. It will be understood, however, that the element 18 may have a form different to that of a round rod, and, for instance, may comprise or include a profiled section on which the device 22 is slideably mounted, for instance with the aid of a slide shoe. The gripping and holding device 22 is pressed down against the upper edge 17 of the uppermost box 16 by means of a pressure spring 30, the other end of which is in abutment with an abutment means 32. In the case of the illustrated embodiment, the abutment means 32 comprises the underside of a nut or knob 34 screwed onto a screw thread 36 on the upper part of the rod 18. The force exerted by the spring 30 can be varied or adjusted, by tightening or slackening the nut or knob 34, as will be described in more detail herebelow.

The base 10 is supported on wheels 38, to facilitate movement of the apparatus from place to place. The base also has mounted thereon lifting means, for instance lifting bars 40, which enable stacked boxes to be lifted and lowered, said boxes either being stacked on a pallet or on the floor. The lifting means may, of course, have the form of lifting forks corresponding to those of a fork-lift truck.

The element 18 is connected at its lower end to the base 10 by means of pivot pin 42, which extends parallel with the direction of the intended rear side or rear edge 44 of a stack. The side of the stack opposite said rear side constitutes an opening or access side 46. The element 18 can be pivoted between a first position 48, in which said element extends substantially parallel with the rear side of the stack 14, and a second position 50 in which the element is angled relative to said rear side 44 of said stack. The element 18 can be swung outwards through a limited maximum angle, defined by a stop member 52. When the element 18 occupies its second position, the gripping device 22 will have forced the upper part 14a of the stack 14 to swing-out from the lower part 14b of said stack, around a pivot point or fulcrum 54 located on the rear side 44 of the stack.

The forward end of a box 16" is swung away from an underlying box 16' about said pivot point 54, so as to form an opening 56 between said boxes 16' 16". This enables goods to be deposited in the box 16' or plucked therefrom, through the opening 56.

The inventive apparatus thus operates in the following manner. The boxes, or crates, are normally stacked in a substantially vertical column for transportation and storage purposes. The interior of a selected box, e.g. the box 16', can be made accessible, however, by exerting an upwardly directed force P on the opening side 46 of the nearest overlying box 16". In addition, a horizontal auxiliary force Q can also be applied to the upper part of the tilting or tipping device 12. The upper part 14a of the stack will then rotate around the aforesaid pivot point 54 at the same time as the rod 18 swings around the pivot 20 until rotational movement is stopped by the stop member 52 or until a state of equilibrium is obtained. As this rotation takes place, the distance between the rear upper edge 17 of the uppermost box and the pivot pin 42 will namely decrease when pivoting of the upper part 14a of the stack increases. In this way, there is formed between the boxes 16' and 16" an opening 56 through which items or goods can be deposited into or removed from the box 16'.

The interior of the box 16" lying immediately above the box 16' can be made accessible, in turn, by applying a downwardly acting force K on or at its opening side. The box 16" will then fall down onto the underlying box 16', so as to produce an opening 56 between the boxes 16" and 16"'.

The apparatus is particularly suited for filling the boxes contained in a stack from the bottom of the stack upwards and for emptying said boxes starting from the top of the stack and working downwards. If goods are found in one or more of the boxes lying above the opening 56, it may be necessary to place a spacer block or a support device between the boxes, so as to hold the opening open.

The opening angle α between the boxes 16' and 16" defining said opening will normally lie between 15° and 30°. The opening angle becomes greater with greater opening heights along the vertical extension of the stack. The opening angle α is namely contingent on the equilibrium established between the weight of the upper part 14a of the stack and the spring force exerted downwardly by the pressure spring 30 and also on the vertical height of the stack part 14a, i.e. the number of boxes in said stack part. The spring force can be adjusted by moving the abutment means 32 upwards and downwards along the element 18, with the aid of the tensioning device referenced 34. This enables the spring force to be adjusted commensurately with boxes of different intrinsic weights, and with empty or full boxes, and to different number of boxes, i.e. to different stack heights and/or different number of boxes in the upper stack part 14a.

A box or crate of particularly advantageous configuration is illustrated in FIG. 5. The sides of the box 16 have provided at locations adjacent the rear side 44 of the box upstanding, rounded projections 58, while the undersurfaces of the sides are provided with corresponding, rounded recesses 60. Together with corresponding members on the overlying and underlying boxes, this arrangement of projections 58 and recesses 60 forms said pivot means or fulcrum 54 which functions to open-up the stack. In this case, the opening or access side 46 slopes forwards, and may optionally be terminated upwardly with an upper edge 62 located at a lower level than the upper edge of the remaining sides of the box. This enables several boxes in a stack to be emptied simultaneously, as described in more detail hereinafter. The top and bottom edges of the boxes may also have a different configuration at the rear side 44 of said boxes than that illustrated, for instance may be provided in a known manner with different kinds of corbell-like configurations at their upper edges and notches or recesses in their bottom edges. It is essential, however, that the top edges and bottom edges will engage one another in a manner to prevent the boxes from sliding relative to one another as they are pivoted. Examples of such box configurations are illustrated in FIGS. 6-9.

Figure 2:
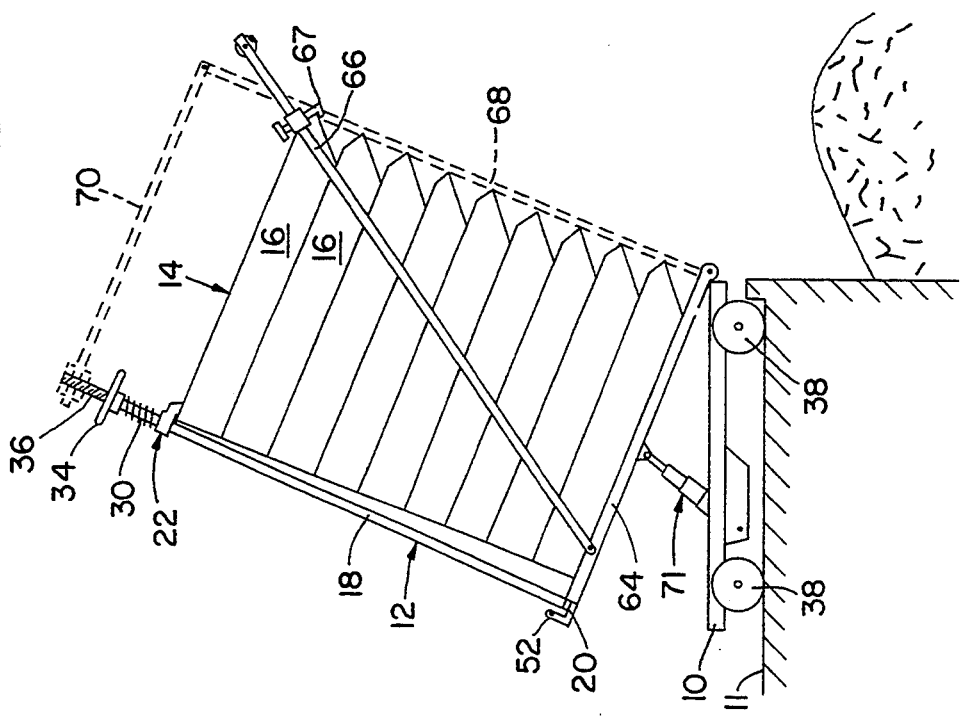
FIG. 2 is a side view of a second embodiment of the invention, incorporating a tipping arrangement.
Figure 4:
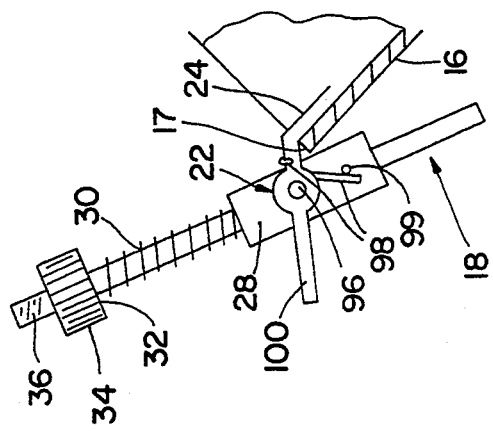
FIG. 4 illustrates part of FIG. 3 in larger scale.

FIG. 2 illustrates an alternative embodiment of the inventive apparatus, which comprises a tippable platform 64 mounted on the apparatus base 10. The stack of boxes 14 is held firmly on the platform during a tipping or tilting operation, with the aid of a diagonal brace 66 and a box-locking means, for instance an adjustably mounted angle iron 67 which engages the uppermost box 16, or with the aid of at least one brace 68 which is mounted on the front side and which is connected to the element 18 by means of a cross-brace 70. This arrangement enables all of the boxes in a stack 14 to be tilted and emptied simultaneously. The stack can be tilted manually or with the aid of a known tilting device, e.g. a telescopic, hydraulic piston-cylinder device 71.

Figure 3:
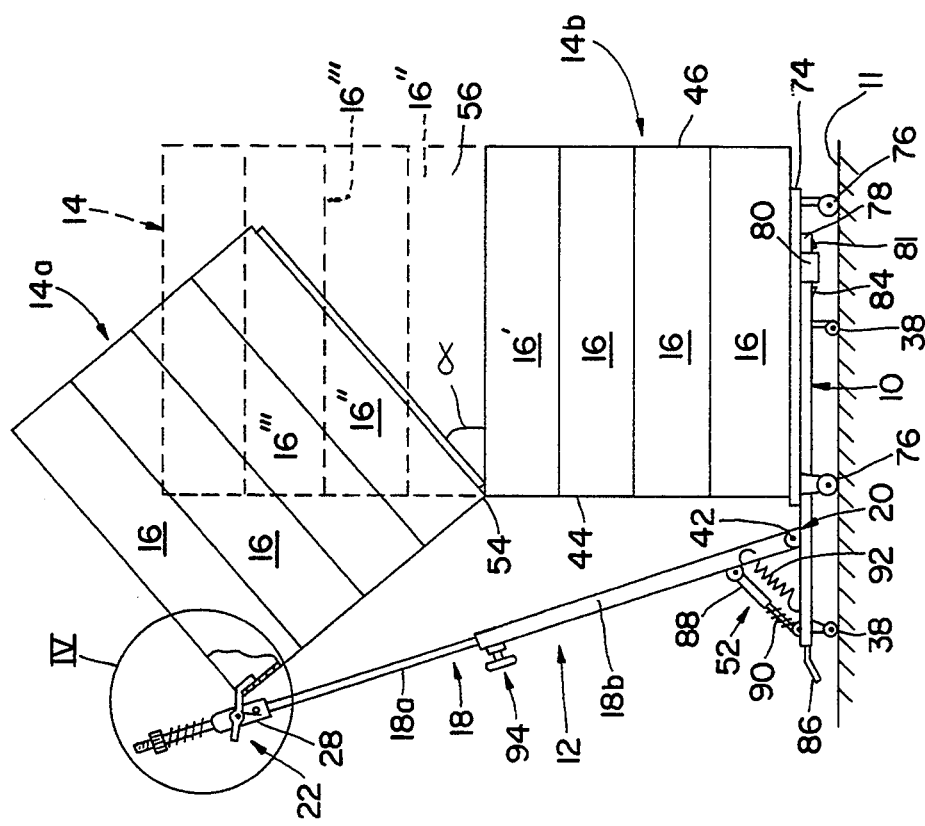
FIG. 3 is a side view of a third embodiment of the invention.

FIG. 3 illustrates a further embodiment of the inventive apparatus. Those structural members which correspond to the FIG. 1 embodiment have been identified with the same reference signs. This embodiment is particularly intended for use when handling stacks of boxes which are placed on a conventional pallet or a pallet 74 fitted with wheels or rollers 76. The wheeled base 10, 38 is intended to be inserted beneath the pallet, with the upper surface of the base in contact with the undersurface of the pallet. The base 10 is advantageously provided with an outwardly projecting part 78 which engages a U-shaped attachment 80 on the undersurface of the wheeled pallet 74, so as to prevent relative movement between the base 10 and the pallet. The projecting part 78 may also be secured in the attachment 80 with the aid of locking shoulders 82, 84. According to one preferred embodiment, the locking shoulders are capable of being indented by means of a system of links (not shown) and, for instance, a foot pedal 86.

In the case of the FIG. 3 embodiment, the stop member 52 of the tilting device 12 comprises a pivotally mounted telescopic arm 88 provided with a retarding pressure spring 90. In order to prevent excessive tilting or pivoting of the element 18, a tension spring 92 may be fitted between the element 18 and the base 10. The aforesaid retarding spring 92 may also be fitted concentrically with or in the extension of the telescopic arm 88. The stop member 52 of the tilting arrangement may be made adjustable for mutually different box weights or opening angle α, by enabling the stop member to be moved or adjusted positionally and/or by enabling adjustments to be made to the spring force exerted by the spring 90.

In the illustrated case, the element 18 has the form of a telescopic rod, having an upper part 18a and a lower part 18b. The length of the telescopic rod can be adjusted to comply to the extension of the stack 14, with the aid of a locking device 94, for instance a locking screw. Naturally, the locking device may have any appropriate form, such as a locking pin intended for coaction with a plurality of through-passing holes in the rod parts 18a and 18b. In the case of the illustrated embodiment, the gripping and holding device 22 has the form of a hook 24 pivotally mounted on a pivot pin 96. The hook 24 is urged against the uppermost box 16 by means of a spring 98 which encircles the pivot pin 96 and the other end of which abuts an abutment means 99 on the bushing 28. The hook 24 can be lifted from engagement with said box, with the aid of a handle 100 which extends in an opposite direction. The hook 24 may be configured to restrict the maximum angle α to which the box can be lifted, by pressing against the inside of the uppermost box 16 with a given spring force.

The base 10 of the FIG. 3 embodiment may also be configured differently to the base of the earlier described embodiments. For instance, the base may have the form of a U-structure provided with wheels or rollers and having one or more forks or the like projecting forwardly from the web of the U. Alternatively a large pallet can, of course, be placed on the legs of the U.

The tilting device 12 may also be mounted on a stationary base forming part of an underlying surface 11, normally a floor. As illustrated in broken lines in FIG. 1, the floor or underlying surface 11 may incorporate hoist means 72, by means of which it can be ensured that the box 16' will always be located at a suitable working height. A tilting arrangement having a wheeled or movable base 10 may also be arranged to coact with such a hoist arrangement.

The tilting device 12 may also be movable between different stations or underlying surfaces 11. In this case, the element 18 is firmly pivoted to a lower part 95 having a stop member 52 and a securing part, e.g. a stud 97 for insertion into a hole in the underlying foundation surface 11.

Instead of a pressure spring 30, there may be used a tension spring or a rubber belt or the like. One end of the tension spring or rubber belt is attached firmly to the gripping and holding device 22 and the other end thereof is attached to a movable abutment 32, which in this case is located beneath the gripping and holding device and may consist of a fixed point, such as a pin or bolt, to which said spring, rubber belt or the like can be attached.

As will be understood, the adjustable tensioning device 32, 34 may have a form other than a nut and coacting screw thread. For instance, it may comprise a plate provided with a hole or an axial aperture and mounted on a smooth rod or flange. The plate can be locked firmly at selected positions along the element 18, by positioning the plate obliquely to the element 18 and causing jamming of said plate on said element. The plate can be readily released for movement along said element, by twisting the plate so that it extends perpendicularly to the element 18.

The tensioning device may also comprise a sleeve which is locked firmly to the element 18 with the aid of a locking device corresponding to the locking device 94 of a telescopic rod. This enables the position of the abutment 34 to be quickly changed, which is particularly advantageous when needing to change said position because of wishing to expose the interiors of the upper or the lower boxes in the box stack 14. In the case of an embodiment which incorporates a telescopic rod 18a, 18b, a fixed abutment 32 can be used and length settings can be effected with the aid of the locking device 94.

Figure 10:
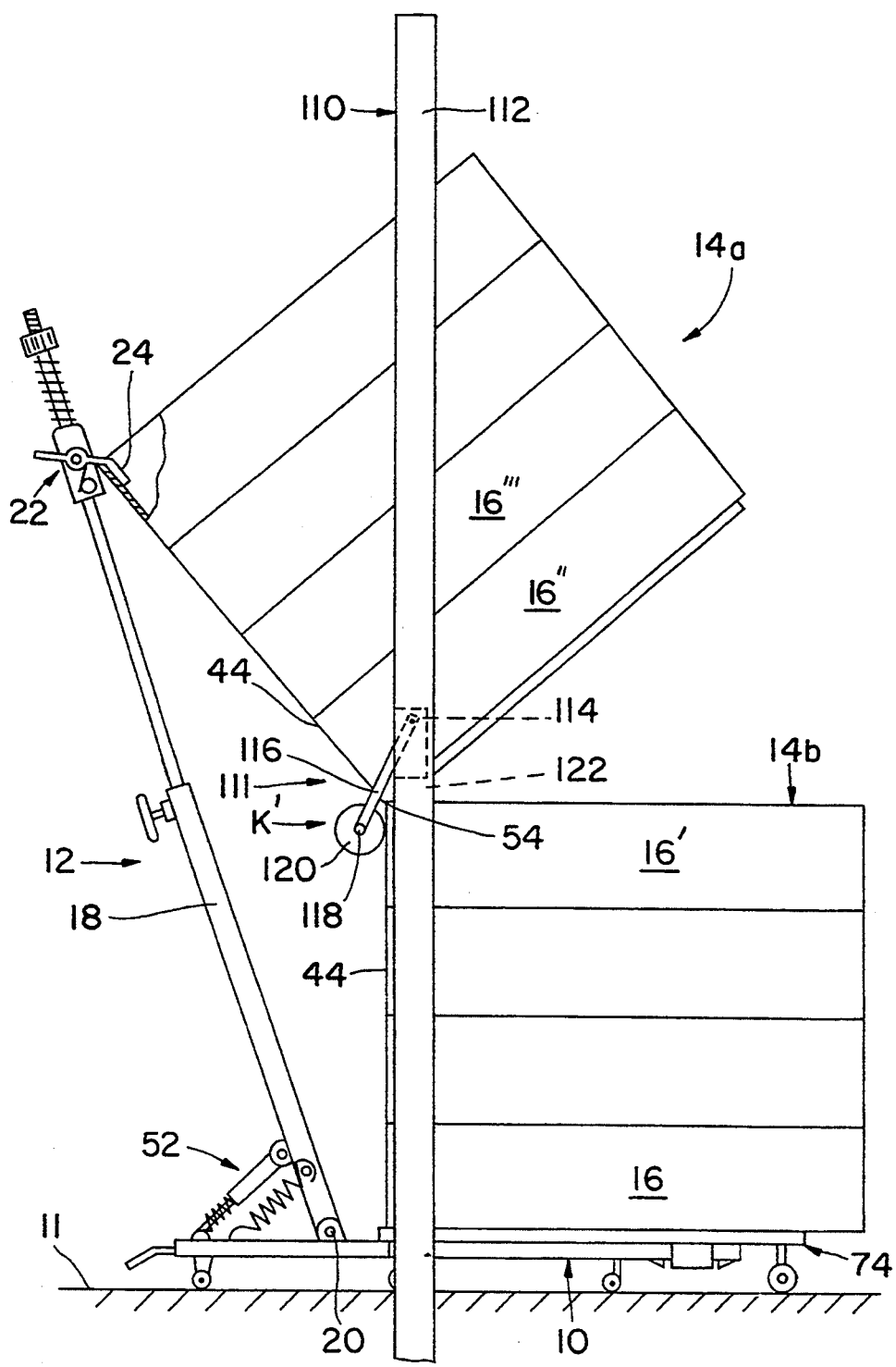
FIG. 10 illustrates an embodiment of the invention comprising a down-tilting device.

Instead of applying a downwardly acting force K on the front side 46 of a box, in order to tip the box downwardly, it is possible to achieve tipping of the box by applying on the rear side 44 of the box concerned, preferably against the upper part of said rear side, a force K' which is directed towards the front side of the box. FIG. 10 illustrates an inventive apparatus 110 constructed to this end. This apparatus includes two posts 112, which carry a down-tilting device 111. The posts may be cast in the floor 11 of a stationary place of use. The down-tilting device is slideably mounted on respective posts, with the aid of slide shoes 114. Extending from each of the slide shoes is a respective pivotally mounted arm 116, the free ends of which are mutually joined by a shaft 118 or transverse rod. Mounted on the shaft 118 are a number of wheels or rollers 120. The wheels are preferably arranged to be pressed against the rear side 44 of the box 16, with the aid of springs or corresponding elements 122.

When using this apparatus, the stack of boxes 14 is located adjacent the apparatus 110, as illustrated in FIG. 10, and the transverse rod 118 is moved to a height which is level with the lowermost box 16, with the aid of any suitable raising and lowering means (not shown), whereafter the gripping and holding device 22 on the tilting device 12 is brought into engagement with the upper edge 17 of the uppermost box 16, as earlier described, whereafter the stack is tilted so as to expose the lowermost box 16. By lifting the down-tilting device 111 upwards, with the aid of the raising and lowering means not shown, the wheels 120 are brought successively into contact with the rear side 44 of the boxes 16, so as to tilt the boxes downwardly in sequence. Movement of the tilting device 111 can be initiated in any desired known manner, for instance with the aid of a manual control or an automatic sensing device as the boxes are filled.

In FIG. 10 there is shown an inventive apparatus which includes a raisable and lowerable tilting device 111. It will be understood, however, that the tilting device may be held stationary and the stack moved up and down with the aid of a hoist arrangement 72. In this way, the interior of a box 16' to be filled will be accessible at the same height level, irrespective of which box in the stack is to be filled. This reduces the risk of injury due to unsuitable working positions and, furthermore, is particularly suitable when the boxes are filled automatically with the aid, for instance, of belt conveyers.

The device operative to mechanically tilt the boxes need not necessarily comprise two posts 112, as before described, since the device can equally as well comprise only one single post. In this case, journalling and guiding of the arm 116 and the rod or shaft 118 must be made more stable. The advantage afforded by this latter embodiment is that the gripping device 12 is unable to come into a position in which it interferes with the shaft 118 and that it is possible to move the stack readily into position adjacent the apparatus 110.

FIG. 2 illustrates an embodiment of the invention in which the boxes are stacked so as to be held together and to enable all boxes to be emptied simultaneously with the aid of a tiltable platform. This tilting arrangement, however, requires the goods to be tipped into an underlying receptacle of some suitable kind. In order to enable the stack to be tilted at a higher level, the inventive apparatus may include a lifting and emptying arrangement. This arrangement may include a raisable and lowerable gripping device mounted on a post and capable, when in a raised position, to pivot the whole of the stack to an emptying position. The post will preferably be pivotally mounted, so that in a raised position the stack can be swung-in over a suitable container.

It will be understood that the invention is not restricted to the aforedescribed and illustrated embodiments thereof and that modifications can be made within the scope of the inventive concept, as defined in the following claims. For instance, the spring means 30 may also comprise a piston-cylinder device, such as a so-called gas spring.

I claim:

1. Apparatus for use with mutually stacked boxes (16) of which an upper edge (17) of a lower box (16') is in guiding engagement with a lower edge (19) of an overlying box (16''), wherein means (12) are provided for holding a stack of boxes (14) together; and said box-holding means (12) includes an elongated element (18), a gripping and holding device (22) mounted on a top portion of said element (18), spring means (30) operative to urge said device essentially downwards against an upper side edge (17) of an uppermost box (16) of the stack (14), pivot means (20) by means of which the element (18) is pivotally mounted on or adjacent to a support surface of a base (10) of said apparatus for carrying said stack (14), said pivot means (20) being such as to enable the element (18) to be swung out from a first position (48) in which said element extends substantially parallel with one of the sides (44) of the stack (14), to a further position (50) at which an angle is formed at said pivot means (20) between said element (18) and said side (44), wherein said base (10) incorporates means (66, 67, 68, 70) which function to hold all of the boxes in said stack (14) together, and means (64, 71) for tipping the stack to enable all of the boxes (16) in said stack to be emptied simultaneously.

2. Apparatus according to claim 1, wherein mounted at an upper end of the element (18) an abutment (32) is disposed for coacting with said spring means (30), and wherein said abutment (32) is arranged for movement along said element (18).

3. Apparatus according to claim 2, further comprising screw means (34, 36) which function to enable movement of said abutment (32).

4. Apparatus according to claim 1, wherein that said base (10) comprises wheels (38).

5. Apparatus according to claim 1, wherein said element (18) comprises two parts which can be adjusted (94) relative to one another.

6. Apparatus according to claim 1, wherein said base (10) incorporates means for lifting a box stack (14).

* * * * *